US010017862B2

(12) United States Patent
Nagata

(10) Patent No.: US 10,017,862 B2
(45) Date of Patent: Jul. 10, 2018

(54) STAINLESS SUBSTRATE HAVING A GOLD-PLATING LAYER, AND PROCESS OF FORMING A PARTIAL GOLD-PLATING PATTERN ON A STAINLESS SUBSTRATE

(71) Applicant: DAI NIPPON PRINTING CO., LTD., Tokyo (JP)

(72) Inventor: Masahiro Nagata, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 110 days.

(21) Appl. No.: 14/339,152

(22) Filed: Jul. 23, 2014

(65) Prior Publication Data

US 2014/0335369 A1 Nov. 13, 2014

Related U.S. Application Data

(62) Division of application No. 13/979,930, filed as application No. PCT/JP2012/053443 on Feb. 8, 2012, now Pat. No. 8,828,213.

(30) Foreign Application Priority Data

Feb. 9, 2011 (JP) ................................ 2011-025956

(51) Int. Cl.
*B32B 3/10* (2006.01)
*C23C 30/00* (2006.01)
(Continued)

(52) U.S. Cl.
CPC .............. *C23C 30/00* (2013.01); *B05D 3/107* (2013.01); *C23F 1/44* (2013.01); *C25D 3/48* (2013.01);
(Continued)

(58) Field of Classification Search
None
See application file for complete search history.

(56) References Cited

U.S. PATENT DOCUMENTS 4,422,906 A 12/1983 Kobayashi
4,431,685 A 2/1984 Canestaro et al.
(Continued)

FOREIGN PATENT DOCUMENTS

CN 101889363 A 11/2010
EP 0459461 * 5/1991 ............. C23C 18/16
(Continued)

OTHER PUBLICATIONS

May 22, 2012 International Search Report issued in International Patent Application No. PCT/JP2012/053443.
(Continued)

*Primary Examiner* — Seth M Dumbris
(74) *Attorney, Agent, or Firm* — Oliff PLC

(57) ABSTRACT

The process of forming a partial gold-plating pattern on a stainless substrate includes a first plating step, a second plating step, and a stripping step. In the first plating step, pretreatment is applied to a stainless substrate including opposite main planes and a processing site formed of a plane different from the main planes, after which a first gold-plating layer is formed all over the surface of the stainless substrate using a hydrochloric acid plating solution. In the second plating step, mask plating is used to form a second gold-plating layer on the first gold-plating layer that covers the processing site in a desired pattern, and in the stripping step, a portion of the first gold-plating layer in an area where there is none of the second gold-plating layer is stripped off using an alkaline stripping solution.

10 Claims, 8 Drawing Sheets

(51) Int. Cl.

| | |
|---|---|
| ***C23F 1/44*** | (2006.01) |
| ***C25D 3/48*** | (2006.01) |
| ***C25D 5/02*** | (2006.01) |
| ***C25D 5/10*** | (2006.01) |
| ***C25D 5/36*** | (2006.01) |
| ***B05D 3/10*** | (2006.01) |

(52) U.S. Cl.
CPC ............... *C25D 5/022* (2013.01); *C25D 5/10* (2013.01); *C25D 5/36* (2013.01); *Y10T 428/12361* (2015.01); *Y10T 428/12389* (2015.01); *Y10T 428/12889* (2015.01)

(56) References Cited

U.S. PATENT DOCUMENTS

| | | | | |
|---|---|---|---|---|
| 4,447,286 | A * | 5/1984 | Weglin ...................... | C23F 1/04 156/251 |
| 5,124,175 | A * | 6/1992 | Miracky .............. | H05K 1/0293 216/13 |
| 5,719,605 | A | 2/1998 | Anderson et al. | |
| 6,290,331 | B1 * | 9/2001 | Agarwal .............. | B41J 2/14016 347/45 |
| 6,533,376 | B1 * | 3/2003 | Gailus .................. | B41J 2/16517 347/1 |
| 6,635,082 | B1 * | 10/2003 | Hossainy .................. | A61F 2/91 623/1.15 |
| 7,871,737 | B2 | 1/2011 | Washima et al. | |
| 2006/0118952 | A1 | 6/2006 | Suzuki et al. | |
| 2009/0229857 | A1 | 9/2009 | Fredenberg et al. | |
| 2010/0310969 | A1 | 12/2010 | Maeda et al. | |

FOREIGN PATENT DOCUMENTS

| | | | | |
|---|---|---|---|---|
| GB | 1248812 | * | 10/1971 | |
| JP | A-53-080261 | | 7/1978 | |
| JP | A-54-069530 | | 6/1979 | |
| JP | A-55-021536 | | 2/1980 | |
| JP | 02165633 | * | 6/1990 | |
| JP | H04136188 | * | 5/1992 | ............. C23C 28/00 |
| JP | A-2003-247097 | | 9/2003 | |
| JP | A-2007-220785 | | 8/2007 | |
| WO | WO2009031800 | * | 3/2009 | |
| WO | 2009/072665 | A1 | 6/2009 | |

OTHER PUBLICATIONS

Oct. 10, 2014 Office Action issued in CN Application No. 201280008118.8.

* cited by examiner

STAINLESS SUBSTRATE HAVING A GOLD-PLATING LAYER, AND PROCESS OF FORMING A PARTIAL GOLD-PLATING PATTERN ON A STAINLESS SUBSTRATE

This is a divisional application of U.S. application Ser. No. 13/979,930 filed Jul. 16, 2013, which in turn is a National Phase of PCT/JP2012/053443 filed Feb. 8, 2012, which claims foreign priority to JP 2011-025956 filed Feb. 9, 2011. The disclosures of the prior applications are hereby incorporated by reference herein in their entirety.

FIELD OF THE INVENTION

The present invention relates to a process of partially forming a gold-plating pattern directly on stainless steel, especially a stainless substrate, and a stainless substrate having a gold-plating layer on a plane different from main planes.

BACKGROUND OF THE INVENTION

So far, stainless steel has been used for a variety of products such as connectors, fuel cells, hard disk suspensions and inkjets in the form of substrates and the like. And to partially enhance the corrosion resistance of a stainless substrate or for its connection and conduction to outside, a desired pattern formed of an electrically conductive material such as copper, nickel, silver or gold has been formed on the stainless substrate (Patent Publications 1 and 2).

LISTING OF THE PRIOR ART

Patent Publications

Patent Publication 1: JP(A) 2003-247097
Patent Publication 2: JP(A) 2007-220785

SUMMARY OF THE INVENTION

Objects of the Invention

For instance when a copper-plating layer is formed as a first layer on a stainless substrate and a silver- or nickel-plating layer is laminated as a second layer on the first layer for the purpose of pattern formation, however, there is a problem that a passivated film present on the surface of the stainless substrate is poor in adhesion to the copper-plating layer.

When a nickel-plating layer is formed as a first layer all over the surface of a stainless substrate, then a silver- or gold-plating layer is laminated on the first layer in a desired pattern, and finally an unwanted portion of the nickel-plating layer is stripped off thereby forming a double-layer structure pattern, a stripping solution used for the stripping of the nickel-plating layer, whether it is of the alkaline type or the acidic type, may likely have an attack on the silver- or gold-plating layer resulting in discoloration by reason of a differential ionization tendency between the nickel-plating layer and the silver- or gold-plating layer. And to avoid the occurrence of defects due to the attack by the stripping solution, it is required to prevent moisture from being entrained from the outside air, leading to the need of making the silver- or gold-plating layer thicker or increasing current densities to improve integrity. However, this arise problems that there is difficulty forming a thin-film pattern of up to 1 μm in thickness, and an extended production time provides an obstacle to productivity. To avert the occurrence of defects due to the attack by the stripping solution, on the other hand, the first or nickel-plating layer may remain all over the surface; when the stainless substrate is previously provided with a microprocessing pattern, however, there is a problem that the precision of such microprocessing cannot fully be used.

Further, when a gold-plating layer is formed directly on the stainless substrate, it should be formed by mask plating in a desired pattern; however, as treatment for removal of the passivated film off the stainless substrate is less than satisfactory when a cyanide plating solution is used, it causes the adhesion of the gold-plating layer to get uneven or poor. As the treatment for removal of the passivated film is in excess, on the other hand, there is a problem that the surface corrosion of the stainless substrate occurs. When a hydrochloric acid plating solution is used, the stainless substrate undergoes concurrently surface corrosion during plating, which facilitates the adhesion of the gold-plating layer. However, although an area of the stainless substrate that need not be formed with the gold-plating layer is covered with the mask, yet there is a problem that a higher hydrochloric acid concentration of the hydrochloric acid plating solution is needed for achieving faster plating, causing corrosion and placing some limitation on productivity improvements.

In another parlance, the above problems are challenges in view of chemical reactions, and when there are processing sites such as a recessed pattern and through-holes present on the stainless substrate so much so that the surface configuration gets complicated, or even when there is none of such processing sites, it is desired to form a gold-plating layer directly on a desired site alone of the stainless substrate, thereby reducing the amount of gold used for the purpose of achieving efficient formation of the gold-plating layer.

Having been made with such situations as mentioned above in mind, the present invention provides a process of forming a thin, defect-free gold-plating layer directly on a desired site of a stainless substrate while holding back corrosion of the stainless substrate, and a stainless substrate having a gold-plating layer.

Means for Accomplishing the Objects

To accomplish such objects as described above, the present invention provides a process of forming a partial gold-plating layer pattern on a stainless substrate, which comprises a first plating step of applying pretreatment to a stainless substrate including opposite main planes and a processing site formed of a plane different from said main planes and then forming a first gold-plating layer all over the surface of said stainless substrate using a hydrochloric acid plating solution, a second plating step of using mask plating to form a second gold-plating layer on a portion of said first gold-plating layer that covers said processing site in a desired pattern, and a stripping step of stripping off a portion of said first gold-plating layer in an area where there is none of said second gold-plating layer using an alkaline stripping solution.

The present invention also provides a process of forming a partial gold-plating layer pattern on a stainless substrate, which comprises a first plating step of applying pretreatment to a stainless substrate including opposite main planes and a processing site formed of a plane different from said main planes, then forming a resist pattern on said stainless substrate in such a way as to expose a desired region including at least said processing site and finally forming a first gold-plating layer on an exposed surface of said stainless substrate using a hydrochloric acid plating solution, a second plating step of using mask plating to form a second gold-plating layer on said first gold-plating layer that covers said processing site in a desired pattern, and a stripping step of stripping off a portion of said first gold-plating layer in an area where there is none of said second gold-plating layer using an alkaline stripping solution.

In one aspect of the invention, the mask plating in said second plating step makes use of a mask having an opening whose area is smaller than an area of said processing site upon projection onto a plane parallel with said main planes.

In one aspect of the invention, said resist pattern is made thicker than the first gold-plating layer to be formed.

In one aspect of the invention, said second plating step makes use of a cyanide plating solution, and said first gold-plating layer has a thickness in a range of 0.010 to 0.15 μm.

In one aspect of the invention, said second plating step makes use of a hydrochloric acid plating solution, and said first gold-plating layer has a thickness in a range of 0.015 to 0.15 μm.

In one aspect of the invention, the pretreatment of the stainless substrate in said first plating step includes alkali washing and hydrochloric acid dipping.

In one aspect of the invention, gold ions are recovered after said first plating step, and after said second plating step.

In one aspect of the invention, the second gold-plating layer formed in said second plating step is made thicker than the first gold-plating layer formed in said first plating step.

Further, the present invention provides a process of forming a partial gold-plating layer pattern on a stainless substrate, which comprises a first plating step of applying pretreatment to a stainless substrate, then forming a resist pattern in such a way as to expose only a desired site of said stainless substrate, and finally forming a first gold-plating layer on an exposed surface of said stainless substrate using a hydrochloric acid plating solution, a second plating step of using mask plating to form a second gold-plating layer on said first gold-plating layer in a desired pattern, and a stripping step of stripping off a portion of said first gold-plating layer in an area where there is none of said second gold-plating layer using an alkaline stripping solution.

In one aspect of the invention, said resist pattern in said first plating step is made thicker than the first gold-plating layer to be formed.

In one aspect of the invention, said mask in said second plating step is located after removal by stripping of said resist pattern formed in said first plating step.

In one aspect of the invention, said second plating step makes use of a cyanide plating solution, and said first gold-plating layer has a thickness in a range of 0.010 to 0.15 μm.

In one aspect of the invention, said second plating step makes use of a hydrochloric acid plating solution, and said first gold-plating layer has a thickness in a range of 0.015 to 0.15 μm.

In one aspect of the invention, the pretreatment of the stainless substrate in said first plating step includes alkali washing and hydrochloric acid dipping.

In one aspect of the invention, gold ions are recovered after said first plating step, and after said second plating step.

In one aspect of the invention, the second gold-plating layer formed in said second plating step is made thicker than the first gold-plating layer formed in said first plating step.

Further, the present invention provides a stainless substrate including opposite main planes and a processing site formed of a plane different from said main planes, wherein there is no gold-plating layer present on said main planes, and there is a gold-plating layer present on the surface of said processing site.

In one aspect of the invention, said gold-plating layer has a thickness in a range of 0.15 to 1 μm.

Furthermore, the present invention provides a stainless substrate including opposite main planes and a processing site formed of a plane different from said main planes, wherein there is a gold-plating thin film present on at least a part of said main planes, and there is a gold-plating layer present on the surface of said processing site, said gold-plating layer being thicker than said gold-plating thin film by 0.15 to 1 μm.

In one aspect of the invention, said processing site is a recess and/or a through-hole.

Advantages of the Invention

According to the inventive process of forming a gold-plating pattern, the first gold-plating layer is formed all over the surface of, or on at least the desired site of, the pretreated stainless substrate using a hydrochloric acid plating so that the adhesion between the stainless substrate and the first gold-plating layer can be improved. The second gold-plating layer is formed only on the first gold-plating layer by mask plating in the desired pattern, and the first gold-plating layer is then stripped off using an alkaline stripping solution so that any attack on the stainless substrate can be prevented. Since there is no differential ionization tendency between the first gold-plating layer and the second gold-plating layer, any attack on the second gold-plating layer is held back so that the second gold-plating layer can be thinned. This enables a thin-film pattern of up to 1 μm to be formed on the stainless substrate. Although the formed gold-plating layer pattern is of a double-layer structure, both the layers are gold-plating layers, so providing a stable film with no interlayer cell reactions. Further, when the stainless substrate has an unnecessary gold-plating pattern site, this site can be so exposed that even when the stainless substrate is pre-processed, there is no obstacle to taking advantage of this site. In addition, when the gold-plating layer is formed only on the desired site using the resist pattern, it is possible to cut back the amount of gold used thereby achieving efficient formation of the gold-plating layer pattern.

In the inventive stainless substrate, where there are the gold-plating layers present is the processing site formed of the plane different from the main planes, so that the portion of the stainless substrate in the area where the main planes are exposed can have a thickness determined as desired. It is thus possible to maintain the strength needed for handling on production, boost up working efficiency and automated equipment efficiency, and facilitate handling, leading to reduction of defects.

In the inventive stainless substrate, the gold-plating layers are present on the processing site formed of the plane different from the main planes and the gold-plating thin film is present on the main planes, so making sure prevention of reformation of the passivated film on the stainless substrate. It is thus possible to boost up working efficiency and automated equipment efficiency, and facilitate handling, leading to reduction of defects.

EMBODIMENTS FOR CARRYING OUT THE INVENTION

Embodiments of the invention will now be explained.

[How to Form the Gold-plating Pattern]

There is no particular limitation on the stainless steel of the stainless substrate to which the inventive pattern-formation process is applied; for instance, it may be austenite or ferrite stainless steels.

Figure 1:
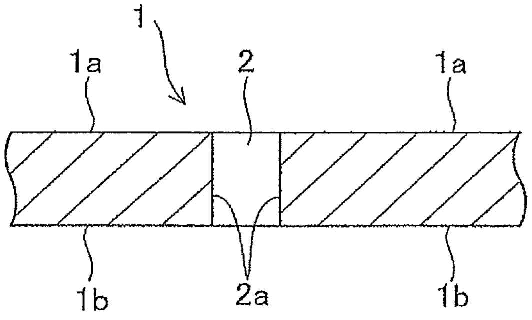
FIG. 1 is a fragmentary sectional view of one example of the stainless substrate having a processing site.
Figure 2:
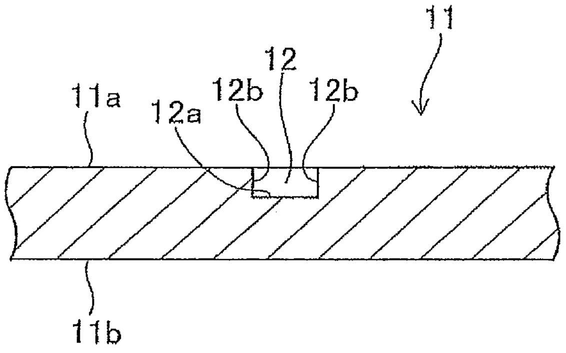
FIG. 2 is a fragmentary sectional view of another example of the stainless substrate having a processing site.

The stainless substrate to which the inventive process of forming a gold-plating pattern is applied includes opposite main planes and a processing site formed of a plane different from the main planes. Such a processing site may be defined by a variety of shapes such as recesses, grooves, and holes formed by etching, pressing or the like. FIG. 1 is illustrative of one example of the stainless substrate having the processing site. As shown, a stainless substrate 1 includes opposite main planes 1*a* and 1*b* and a through-hole 2 formed as the processing site by wall planes 2*a* different from the main planes 1*a* and 1*b*. There is no limitation on the number, position, size, and shape of the through-hole 2 as the processing site. FIG. 2 is illustrative of another example of the stainless substrate having the processing site. As shown, a stainless substrate 11 includes opposite main planes 11*a* and 11*b* and a recess 12 formed as the processing site by bottom and wall planes 12*a* and 12*b* different from the main plane 11*a*. There is no limitation on the number, position, size, and shape of the recess 12 as the processing site.

It is here to be noted that the main planes used herein refer to a pair of planes that oppose each other in the thickness direction of the stainless substrate before processing such as etching or pressing is applied to it.

The inventive process of forming a partial gold-plating pattern will then be explained with reference to FIGS. 3A-3D and FIGS. 4A-4D. Note here that in the examples of FIGS. 3A-3D and FIGS. 4A-4D, the stainless substrates 1 and 11 shown in FIGS. 1 and 2 are typically used.

Figure 3A:
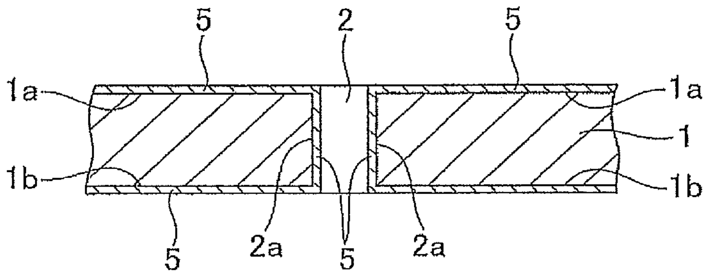
FIGS. 3A to 3D are step diagrams illustrative of one example of the inventive process of forming a partial gold-plating pattern.
Figure 3B:
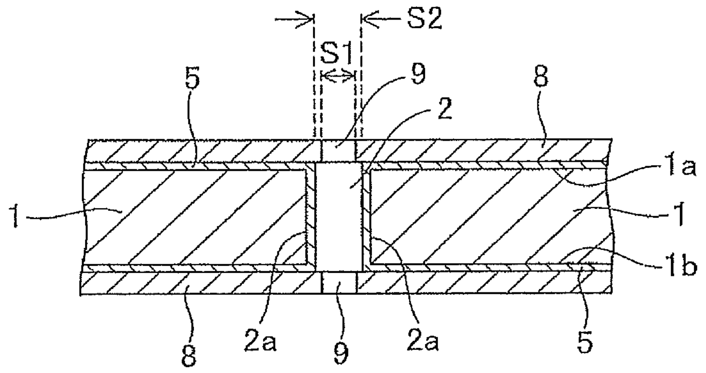
Figure 4A:
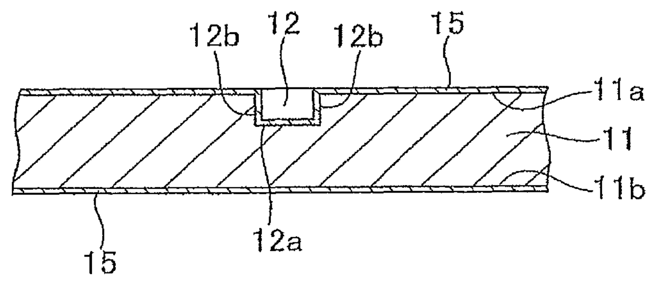
FIGS. 4A to 4D are step diagrams illustrative of another example of the inventive process of forming a partial gold-plating pattern.
Figure 4B:
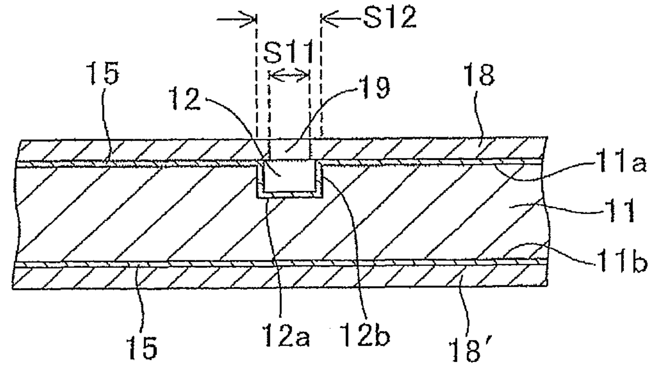

In the first plating step of the inventive process, pretreatment is applied to the stainless substrate 1, 11 including the main planes and the processing site formed of planes different from the main planes, after which the first gold-plating layer 5, 15 is formed directly all over the surface of the substrate using a hydrochloric acid plating solution (FIG. 3A and FIG. 4*a*). Referring to the stainless substrate 1, the first gold-plating layer 5 is formed on the main planes 1*a* and 1*b* and the wall planes 2*a* forming the through-hole 2 that is the processing site, and referring to the stainless substrate 11, the first gold-plating layer 15 is formed on the main planes 11*a* and 11*b* and the bottom and wall planes 12*a* and 12*b* forming the recess 12 that is the processing site.

The purpose of pretreatment applied to the stainless substrate 1, 11 is to degrease its surface and remove any passivated film for activation; for instance, a choice may be made from treating methods such as alkaline dipping, alkaline electrolysis, acid electrolysis, and acid dipping. Note here that after the application of pretreatment, a transition time to the formation of the first gold-plating layer 5, 15 may be set such that there is no reformation of any passivated film on the stainless substrate 1, 11.

The formation of the first gold-plating layer 5, 15 may be implemented using a hydrochloric acid plating solution. In consideration of prevention of an attack on the stainless substrate 1, 11 and curtailing of plating time, the hydrochloric acid plating solution used should preferably be determined. For instance, use may be made of a hydrochloric acid plating solution prepared such that the number of minute pits occurring on the surface of the stainless substrate 1, 11 used is up to 5 per unit area ($mm^2$) Note here that such minute pits may be measured under a scanning electron microscope after the stainless substrate is dipped in the hydrochloric acid plating solution for 10 seconds, washed with water, and dried. The use of such a hydrochloric acid plating solution permits moderate dissolution to occur concurrently on the surface of the stainless substrate 1, 11 during gold plating, thereby making the adhesion between the first gold-plating layer 5, 15 and the stainless substrate 1, 11 better.

The upper limit to the thickness of the first gold-plating layer 5, 15 formed should preferably be 0.15 μm; in other words, thicknesses exceeding 0.15 μm are not preferable because of a lowering of stripping efficiency for the first gold-plating layer 5, 15 in the stripping step. The lower limit to the thickness of the first gold-plating layer 5, 15 formed should preferably be set depending on the plating solution used in the second plating step. More specifically, when the cyanide plating solution is used in the second plating step, the lower limit to the thickness of the first gold-plating layer 5, 15 should be set at 0.010 μm in consideration of the fact that uniform thickness control is possible. When the hydrochloric acid plating solution is used in the second plating step, the lower limit to the thickness of the first gold-plating layer 5, 15 should be set at 0.015 μm in consideration of prevention of corrosion of the stainless substrate by the hydrochloric acid plating solution in the second plating step.

Here the thickness of the first, and the second gold-plating layer should be measured as described just below. After the formation of each plating layer, measurement is carried out using a fluorescent X-ray thickness meter made by Seiko Instruments Inc. Note here that calibration curves for X-ray outputs and thicknesses are beforehand provided using at least two standard foils encompassing the thickness target value to be measured: one being thinner than the target value of the thickness to be measured and the other being thicker. To add to this, section processing is implemented using FIB (focused ion beams), after which section observation is done under an SEM (scanning electron microscope) to observe thickness for each layer wherein gold particles appearing in section differ in size on the basis of a scale depending on taken magnification.

It is here to be noted that the first gold-plating layer 5, 15 formed in the first plating step may be neutralized for the purpose of activation. Such activation makes sure the adhesion of the second gold-plating layer in the following step is further improved.

Figure 3C:
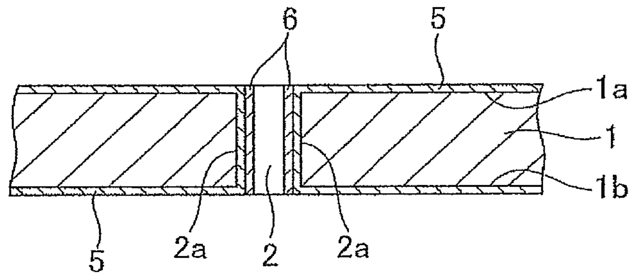
Figure 4C:
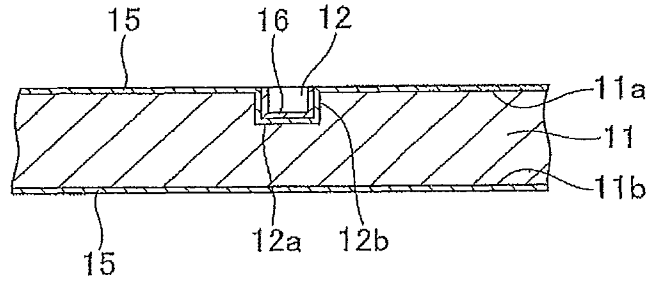

Then, there is the second plating step implemented wherein mask plating (FIG. 3B) using masks 8 and 8 each having an opening 9 is used to form the second gold-plating layer 6 only on the first gold-plating layer 5 in the desired pattern, said first gold-plating layer 5 covering the wall plane of the through-hole 2 that is the processing site of the stainless substrate 1 (FIG. 3C). Likewise, mask plating (FIG. 4B) using mask 18 having an opening 19 and mask 18' is used to form the second gold-plating layer 16 only on the first gold-plating layer 15 in the desired pattern, said first gold-plating layer 15 covering the bottom and wall planes of the recess 12 that is the processing site of the stainless substrate 11 (FIG. 4C).

The masks used for mask plating in the second plating step are to form the second gold-plating layer only on the processing site of the stainless substrate or only on the desired region of the processing site of the stainless substrate if required. For instance, the masks 8 and 8 used for mask plating on the stainless substrate 1 each may have the opening 9 whose area S1 is smaller than the opening area S2 of the through-hole 2 (processing site) through the main plane 1*a* (1*b*) of the stainless substrate 1. Likewise, the mask 18 used for mask plating on the stainless substrate 11 may have the opening 19 whose area S11 is smaller than the opening area S12 of the recess 12 (processing site) in the main plane 11*a* of the stainless substrate 11. Thus, use of the masks having the openings 9 and 19 whose areas S1 and S11 are smaller than the opening areas S2 and S12 of the processing sites makes sure prevention of formation of the second gold-plating layer on the surface of the stainless substrate 1. Accordingly, it is possible to prevent the occurrence of a conventional plating section where thicker plating layers are formed at the corners of the recess and opening. This does not only work in favor of control of the formation of the second plating layer, but also permits the masks used to have a precision margin, resulting in less costly, simpler formation of plating layers. In this case, the areas S1 and S11 of the openings 9 and 19 in the masks may properly be determined in consideration of the area of the processing site, conditions for the plating solutions, location precision of the masks, etc. For instance, it is desired that the areas S1 and S11 be set in such a way as to account for 90 to 50% of the opening areas S2 and S12 of the processing site.

There is no particular limitation on the material of such masks 8, 8 and 18, 18' provided that it is of electrical insulation; for instance, use may be made of plating silicon masks made by the Shin-Etsu Chemical Co., Ltd.

The plating solution used in the second plating step may be either of the cyanide type or of the hydrochloric acid type. There is no particular limitation on the cyanide plating solution; use may be made of cyanide plating solutions known so far in the art. The hydrochloric acid plating solution used is free of such restrictions as imposed on the first plating step; use may be made of hydrochloric acid plating solutions known so far in the art.

While the thickness of the second gold-plating layers 6 and 16 formed may optionally be determined depending on the application of the gold-plating layer pattern formed, it is here to be understood that the thickness of the second gold-plating layers 6 and 16 may be determined in such a way as to provide a thin film in which the total thickness of the first gold-plating layers 5, 15 and the second gold-plating layers 6, 16 is less than 1 μm.

Figure 3D:
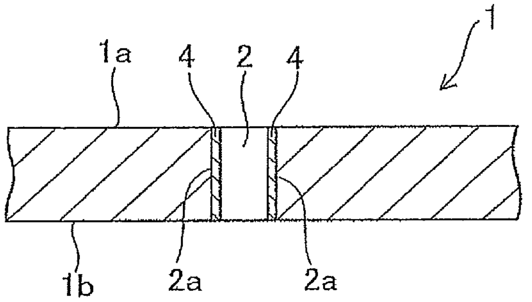
Figure 4D:
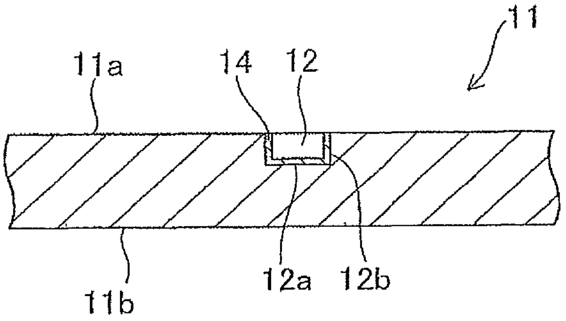

Then in the stripping step, portions of the first gold-plating layers 5 and 15 in an area where there is none of the second gold-plating layers 6 and 16 are stripped off using an alkaline stripping solution to form gold-plating patterns 4 and 14 only on the wall plane 2*a* of the through-hole 2 that is the processing site, and only on the bottom and wall planes 12*a* and 12*b* of the recess 12 that is the processing site (FIGS. 3D and 4D).

It is to be noted that the pattern used herein refers to any desired graphic figures such as lines, circles, eclipses, polygons, and designs; for instance, any desired electrical wirings and convex shapes are included in it.

The alkaline stripping solution used in the stripping step, for instance, includes Gold Stripper 645 made by Evonik Degussa Japan Co., Ltd. and Enstrip AU-78M made by Meltex Co., Ltd. Any one of these strippers may be used with spraying, dipping or the like to strip off the first gold-plating layer.

According to such an invention as described above, in the first gold-plating step, the first gold-plating layer is formed directly all over the surface of the pretreated stainless substrate, resulting in improvements in the adhesion between the stainless substrate and the first gold-plating layer. In the second plating step, mask plating is used to form the second gold-plating layer only on the first gold-plating layer in the desired pattern, said first gold-plating layer covering the processing site of the stainless substrate, and in the following stripping step, the first gold-plating layer is stripped off using the alkaline stripping solution, resulting in prevention of an attack on the stainless substrate. There is no differential ionization tendency between the first gold-plating layer and the second gold-plating layer, which enables the second gold-plating layer to be thinned without any attack on the second gold-plating layer. This in turn enables a thin-film pattern of up to 1 μm to be formed on the processing site of the stainless substrate. Note here that the thin-film pattern comprising gold-plating layers should preferably have a thickness of 0.15 μm or more in view of reliability of electrical conduction, and of less than 1 μm in view of the cost of a production process using gold plating. Although the formed gold-plating layer pattern is of a double-layer structure, both the layers are gold-plating layers, so providing a stable film with no interlayer cell reactions. Further, when the stainless substrate has an unnecessary gold-plating pattern site, this site can be so exposed that there is no obstacle to taking advantage of this site depending on its purpose.

When the processing site formed as by etching or pressing on the stainless substrate is provided with a gold-plating layer pattern by a conventional process, current densities grow high at the etched portion of the processing site, giving rise to local increases in the gold-plating layer thickness. In the invention, however, a portion of the first gold-plating layer in an area where there is none of the second gold-plating layer is stripped off using the alkaline stripping solution, during which the second gold-plating layer is attacked by the alkaline stripping solution too. This makes the partial gold-plating pattern covering the processing site smooth, ensuring an appearance feature that prevents the gold-plating layer from getting locally thick.

Further, the inventive process of forming a gold-plating pattern may be embodied as mentioned below.

Figure 5A:
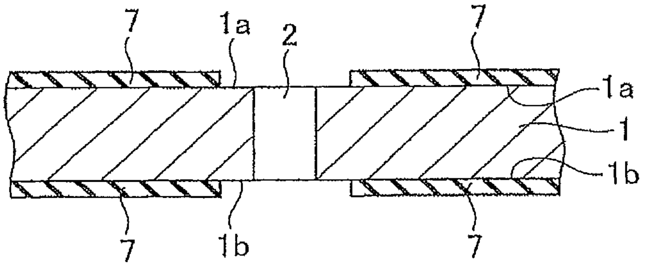
FIGS. 5A to 5E are step diagrams illustrative of yet another example of the inventive process of forming a partial gold-plating pattern.
Figure 5B:
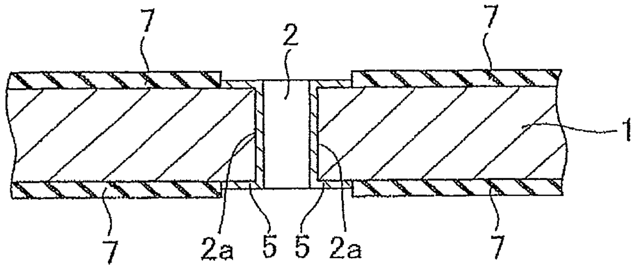
Figure 5C:
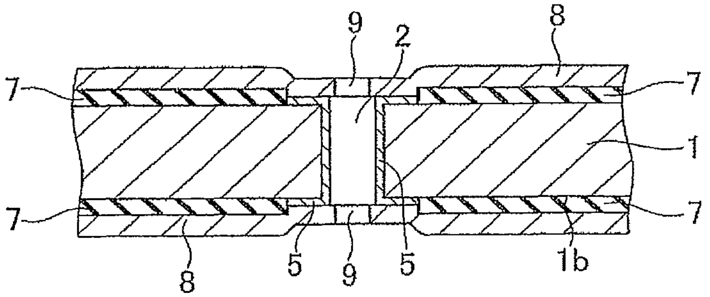

The present invention may be modified such that in the first plating step, a resist pattern is formed on the stainless substrate in such a way as to expose at least the processing site, and the first gold-plating layer is then formed directly on the exposed surface of the stainless substrate using the hydrochloric acid plating solution. Such an embodiment of the invention is now explained with reference to a set of steps shown in FIGS. 5A to 5E while referring to the example shown in FIGS. 3A to 3D. In this embodiment, a stainless substrate 1 including opposite main planes and a processing site (through-hole 2) formed of a different plane from the main planes is first pretreated in the first plating step. Thereafter, resist patterns 7 and 7 are formed on the main planes 1*a* and 1*b* in such a way as to expose the through-hole 2 that is the processing site (FIG. 5A). Each of the resist patterns 7, 7, for instance, may be formed by laminating dry film resists and patterning them by photolithography. In this case, a part of the stainless substrate 1 remains exposed for supplying power for plating. For instance, a peripheral portion of the stainless substrate 1 is exposed or, alternatively, a power-supply pattern provided at the peripheral portion is exposed. Then, a first gold-plating layer 5 is formed on the exposed main planes 1*a* and 1*b* of the stainless substrate 1 and wall planes 2*a* forming the through-hole 2 that is the processing site (FIG. 5B). Note here that the formation of the resist patterns 7 and 7 after the pretreatment should be implemented in an early stage for the purpose of preventing reformation of the passivated film, and a transition time to the subsequent formation of the first gold-plating layer 5 should be short enough to prevent the passivated film from being reformed on the stainless substrate 1.

Figure 5D:
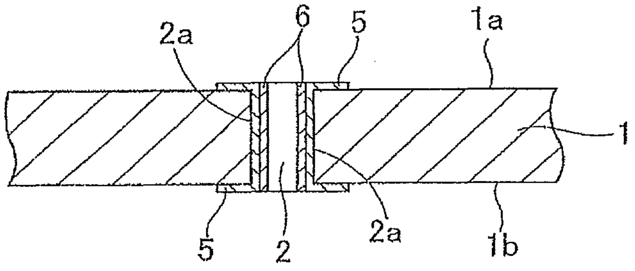

Then in the second plating step, masks 8 and 8 each having an opening 9 are positioned in place (FIG. 5C), and mask plating employing these masks 8 and 8 are used to form a second gold-plating layer 6 only on the first gold-plating layer 5 in the desired pattern, said first gold-plating layer 5 covering the wall planes of the through-hole 2 that is the processing site of the stainless substrate 1. Thereafter, the masks 8 and 8 are removed and the resist patterns 7 and 7 are stripped off (FIG. 5D). An alkaline stripping solution may be used to strip off the resist patterns 7 and 7 but, preferably, not so much that the first gold-plaiting layer 5, too, is stripped off. This is to prevent concurrent stripping of the first gold-plating layer 5 together with the resist patterns 7 and 7, which may otherwise give rise to a lowering of such gold recovery efficiency as will be described later.

Figure 5E:
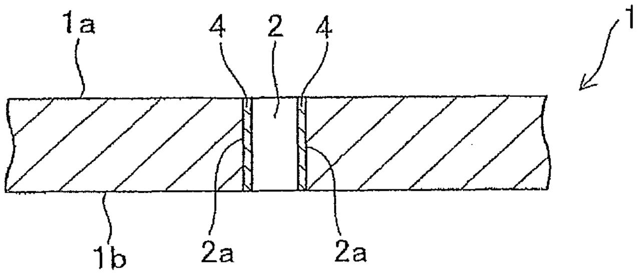

Then in the stripping step, a portion of the first gold-plating layer 5 in an area where there is none of the second gold-plating layer 6 is stripped off using the alkaline stripping solution to form a gold-plating pattern 4 only on the wall planes 2*a* of the through-hole 2 that is the processing site (FIG. 5E).

In this embodiment of the invention, the resist patterns 7 and 7 should preferably be formed in such a way as to be thicker than the first gold-plating layer 5. This is to prevent the first gold-plating layer 5 from going up onto the resist patterns 7 and 7 thereby facilitating removal by stripping of the resist patterns 7 and 7.

Figure 6:
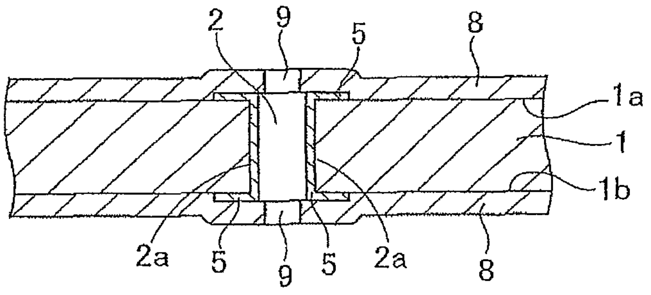
FIG. 6 is illustrative of a further example of the inventive process of forming a partial gold-plating pattern.

Alternatively, the resist patterns 7 and 7 may be stripped off before implementing mask plating employing the masks 8 and 8. In FIG. 6 corresponding to the above-mentioned FIG. 5C, an arrangement for mask plating after stripping of the resist patterns 7 and 7 is shown.

It is also possible to leave the resist patterns 7 and 7 not stripped in the stage of FIG. 5D; that is, in the following stripping step, the gold-plating layer 5 may be stripped off, followed by stripping of the resist patterns 7 and 7.

It is here to be noted that the embodiment of forming the above resist patterns 7 and 7 may likewise be applied to the stainless substrate having as the processing site such a recess as shown in FIG. 4.

In the invention, such a stainless substrate as having none of the above processing site at all may be used as the stainless substrate to which the inventive process of forming a gold-plating patter is applied. That is, the inventive process of forming a gold-plating pattern may also be applied to a stainless substrate whose opposite main planes have none of various processing sites such as recesses, grooves, and holes formed by etching, pressing, and the like. In other words, the pretreatment may be applied to the stainless substrate having no such a pressing site in the first step, followed by formation of the first gold-plating layer all over the surface of the stainless substrate using the hydrochloric acid plating solution; mask plating may be used in the second plating step to form the second gold-plating layer on the first gold-plating layer in the desired pattern; and a portion of the first gold-plating layer in the area where there is none of the second gold-plating layer may be stripped off in the stripping step using the alkaline stripping solution to form the gold-plating pattern directly on the stainless substrate.

Alternatively, in the first plating step, the pretreatment may be applied to the stainless substrate having no processing site, resist patterns may then be formed such that only the desired site of the stainless substrate is exposed, and the first gold-plating layer may be formed on the exposed surface of the stainless substrate using the hydrochloric acid plating solution; in the second plating step, mask plating may be used to form the second gold-plating layer on the first gold-plating layer in the desired pattern; and in the stripping step, a portion of the first gold-plating layer in the area where there is none of the second gold-plating layer is stripped off using the alkaline stripping solution to form the gold-plating pattern directly on the stainless substrate. This embodiment may be the same as the embodiment explained with reference to FIGS. 5A to 5E in terms of the formation of the resist patterns, the relations of the resist patterns to the thickness of the first gold-plating layer, and the stripping solution for the resist patterns as well as the ability to strip off the resist patterns before the location of the masks.

It is to be understood that such embodiments of the invention as described above are provided for the purpose of exemplification alone, and the invention is not limited to them. For instance, the first plating step may be followed by a step of recovering gold ions from the plating solution, which ions remain deposited onto the stainless substrate without taking part in gold plating reactions and are taken out from the plating solution. Such a gold ion recovery step may also be added to after the second plating step. The addition of such a gold ion recovery step may help cut down the pattern-formation cost.

[Stainless Substrate Having a Gold-plating Layer]

The stainless substrate having a gold-plating layer, to which the invention is applied, may have recesses and/or through-holes either on one main plane or on both opposite main planes. Alternatively, through-holes may be provided through the recess structure.

Figure 7:
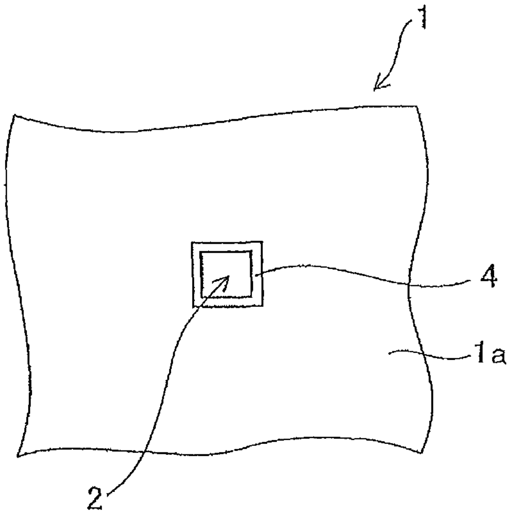
FIG. 7 is illustrative of one example of the inventive stainless substrate having gold-plating layers: it is a fragmentary plan view of the stainless substrate shown in FIG. 3D.

FIG. 7 is illustrative of one example of the inventive stainless substrate having a gold-plating layer: it is a fragmentary plan view of a main plane 1*a* side of a stainless substrate 1 having a gold-plating pattern 4 shown in FIG. 3D. In the example shown in FIG. 7, there is the gold-plating layer 4 present only on the wall plane of a through-hole 2 whereas there is no gold-plating layer present on the main plane 1*a*. Note here that the through-hole 2 is shown to have a square opening by way of example but not by way of limitation.

Figure 8:
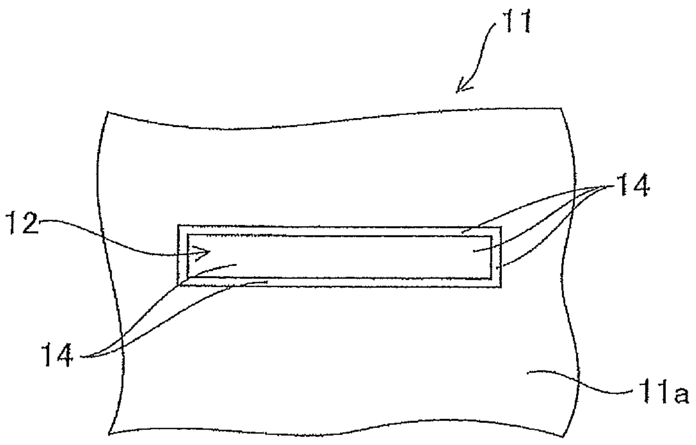
FIG. 8 is illustrative of another example of the inventive stainless substrate having gold-plating layers: it is a fragmentary plan view of the stainless substrate shown in FIG. 4D.

FIG. 8 is illustrative of another example of the inventive stainless substrate having a gold-plating layer: it is a fragmentary plan view of a main plane 11*a* side of a stainless substrate 11 having a gold-plating pattern 14 shown in FIG. 4D. In the example shown in FIG. 8, the stainless substrate 11 has a recess 12, and there is the gold-plating layer 14 present only on the bottom and wall planes forming the recess 12 whereas there is none of the gold-plating layer present on the main plane 11*a*. Note here that the recess 12 is shown to have a rectangular opening by way of example but not by way of limitation.

Figure 9:
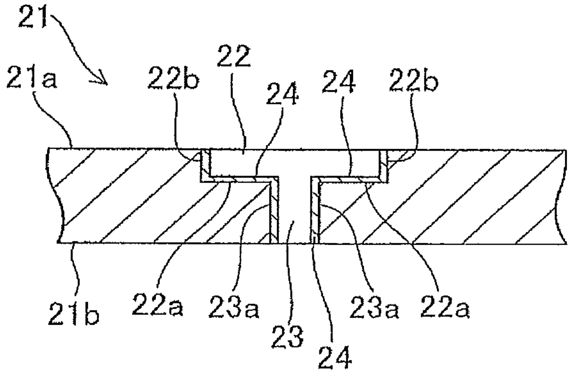
FIG. 9 is a sectional view, corresponding to FIGS. 3D and 4D, of yet another example of the inventive stainless substrate having gold-plating layers.

FIG. 9 is a sectional view of yet another example of the inventive stainless substrate having a gold-plating layer, corresponding to FIGS. 3D and 4D. As shown, a gold-plating layer is formed according to the inventive pattern-formation process on the stainless substrate having a processing site comprising a through-hole through a recess structure. In the example shown in FIG. 9, a stainless substrate 21 has a through-hole 23 through a recess structure 22, and there is a gold-plating layer 24 present only on the bottom and wall planes 22*a* and 22*b* forming the recess structure 22 and the wall plane 23*a* of the through-hole 23 whereas there is no gold-plating layer on main planes 21*a* and 21*b*. The gold-plating layer 24 should preferably have a thickness ranging from 0.15 to 1 μm; that is, thicknesses of less than 0.15 μm will make it difficult to achieve uniform film thickness and will often give rise to a lowering of electrical conduction whereas thicknesses exceeding 1 μm are not preferable in view of production cost.

Figure 10:
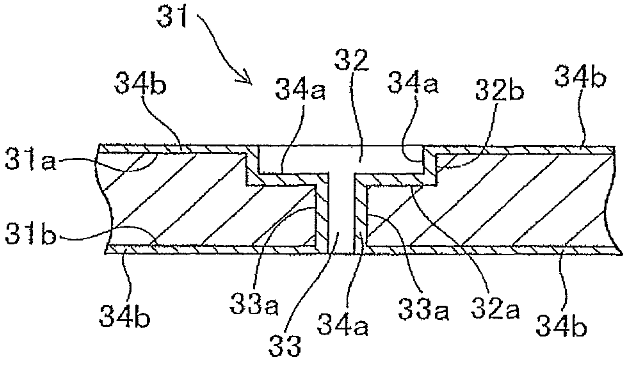
FIG. 10 is a sectional view, corresponding to FIG. 9, of a further example of the inventive stainless substrate having gold-plating layers.

FIG. 10 is a sectional view, corresponding to FIG. 9, of a further example of the inventive stainless substrate having a gold-plating layer. In the example shown in FIG. 10, a stainless substrate 31 has a through-hole 33 in a recess 32, and there is a gold-plating layer 34*a* present on the bottom and wall planes 32*a* and 32*b* forming the recess 32 and the wall plane 33*a* of the through-hole 33. There is also a gold-plating thin film 34*b* present on main planes 31*a* and 31*b*, which prevents reformation of the passivated film on the stainless substrate. The gold-plating layer 34*a* should preferably be thicker than the gold-plating thin film 34*b* by 0.15 to 1 μm. As the thickness difference between the gold-plating layer 34*a* and the gold-plating thin film 34*b* is less than 0.15 μm, it will likely cause a lowering of electrical conduction of the gold-plating layer 34*a*. This is because for instance when the gold-plating thin film 34*b* is stripped off in using the stainless substrate 31, the thickness of the remaining gold-plating layer 34*a* runs short. A thickness difference of more than 1 μm between the gold-plating layer 34*a* and the gold-plating thin film 34*b* is not preferable in view of production cost.

Figure 11:
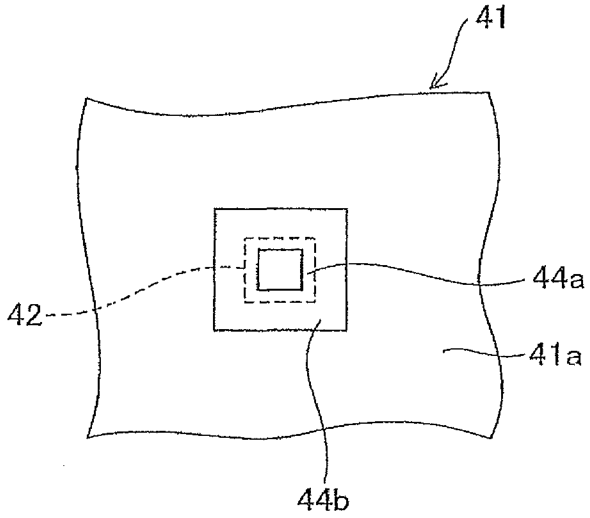
FIG. 11 is a fragmentary plan view of a further example of the inventive stainless substrate having gold-plating layers: it is corresponding to the fragmentary plan view of the stainless substrate shown in FIG. 5D.

In addition, the inventive stainless substrate having a gold-plating layer may have a gold-plating thin film on a part of the main planes. As shown typically in FIG. 5D, the stainless substrate 1 may have the first gold-plating layer 5 formed at the desired sites of the main planes 1*a* and 1*b* and the wall plane of the through-hole 2 as well as the second gold-plating layer 6 formed only on the first gold-plating layer 5 that covers the wall plane of the through-hole 2. FIG. 11 is a fragmentary plan view of an example of the stainless substrate having such a gold-plating layer, corresponding to the fragmentary plan view of the main plane 1*a* side of the stainless substrate 1 shown in FIG. 5D. In the example shown in FIG. 11, a stainless substrate 41 has a through-hole 42, and there is a gold-plating layer 44*a* present on the wall plane forming that through-hole 42 while there is a gold-plating thin film 44*b* present on a part of the main plane 41*a*. In the example shown, the gold-plating thin film 44*b* is positioned around the through-hole 42 that is the processing site, and contiguous to the gold-plating layer 44*a*. This prevents the passivated film from being reformed especially at a site where the passivated film should not preferably be present, for instance, at a site around the processing site, and keeps the amount of the gold-plating thin film positioned on the main plane of the stainless substrate 41 so low that production cost can be cut down. The gold-plating layer 44*a* should be thicker than the gold-plating thin film 44*b* preferably by 0.15 to 1 μm. The reason is the same as that for the thickness difference between the gold-plating layer 34*a* and the gold-plating thin film 34*b* on the above stainless substrate 31. Note here that the processing site is shown as the through-hole by way of example but not by way of limitation.

Figure 12:
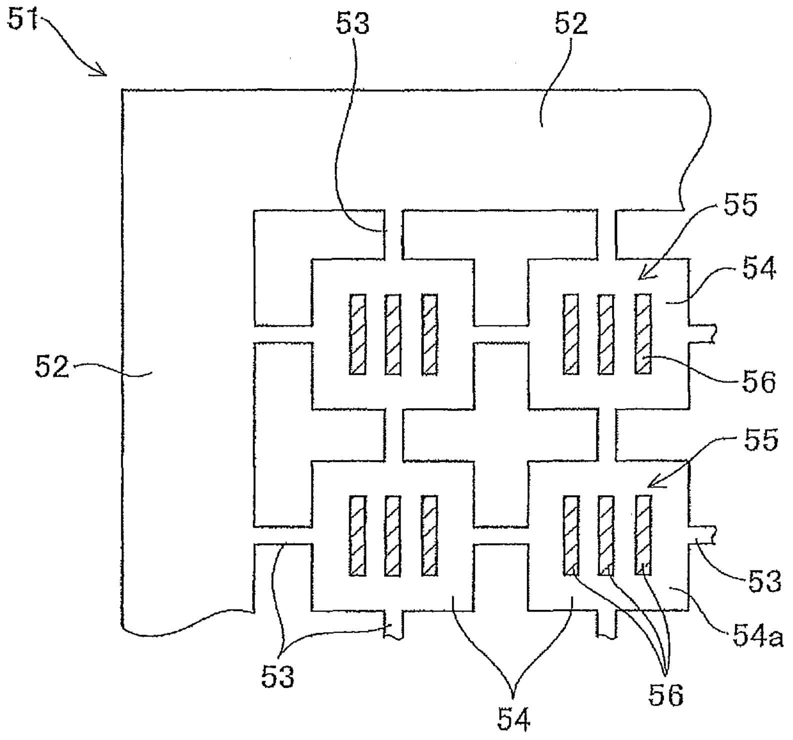
FIG. 12 is a fragmentary plan view of a further example of the inventive stainless substrate having gold-plating layers.

FIG. 12 is a fragmentary plan view of a further example of the inventive stainless substrate having a gold-plating layer. In the example shown in FIG. 12, a stainless substrate 51 includes a framework 52 and a plurality of product regions 54 that are joined and held by joints 53 to the framework 52 and interconnected via joints 53. The product regions 54 are interconnected so as to be arranged in rows and columns within the framework 52. In the example shown, each product region 54 includes a recess 55 as the processing site on its main plane 54*a*, and there are gold-plating layers 56 (hatched in FIG. 12) present only on the bottom and wall planes forming the recess 55 whereas there is no gold-plating layer present the main plane 54*a*. The product regions 54 that the stainless substrate 51 has may be torn off by cutting the joints 53. In the example shown, the recess 55 is shown as the processing site by way of example but not by way of limitation. In the example shown, each product region 54 is shown in a rectangular configuration, but it may be formed as desired in such a way as to receive a variety of products such as connectors, fuel cells, hard disk suspensions, and inkjets. Alternatively, the gold-plating thin film may be formed all over the main plane of the stainless substrate 51 including the framework 52 and joints 53. In this case, the reformation of the passivated film on the stainless substrate 51 is held back. In addition, the gold-plating thin film may be formed all over the main plane 54*a* of the product region 54 or at a desired site of the main plane 54*a*. In this case, the reformation of the passivated film especially at a site where the passivated film should not preferably be present is held back, and the amount of the gold-plating thin film is reduced, making cost reductions possible. Such a gold-plating thin film should be thinner than the gold-plating layer 56 preferably by 0.15 to 1 μm. The reason is the same as that for the thickness difference between the gold-plating layer 34*a* and the gold-plating thin film 34*b* on the above stainless substrate 31.

It is to be noted that there is no particular limitation of the processing site of the inventive stainless substrate having a gold-plating layer; the processing site may be a recess or groove formed by etching, pressing or the like in the stainless substrate in various configuration such as desired lines, circles, eclipses, polygons, and designs. For instance, the processing site may include electric wirings and convexities as desired.

The embodiment according to the invention as described above is provided as an example alone; so the invention would be in no sense limited to that embodiment.

The present invention will now be explained more specifically with reference to a number of examples.

EXAMPLE 1

A SUS 316 material of 0.15 mm in thickness (150 mm×150 mm) was provided as the stainless substrate.

A total of (ten-by-ten) 100 linear recesses of 100 μm in depth, 2,000 μm in width and 5,000 μm in length were formed in one main plane of the stainless substrate at a width direction pitch of 4,000 μm and a length direction pitch of 7,000 μm to obtain the stainless substrate having the processing site. Note here that the above recess pitch is a distance corresponding to the center-to-center distance of the respective recesses; the same will apply hereinafter.

First Plating Step

Hydrochloric acid plating solution A having the following composition was prepared as the hydrochloric acid plating solution.

(Composition of Hydrochloric Acid Plating Solution A)

Metallic gold . . . 2.0 g/mL

Hydrochloric acid . . . 40 g/mL

Cobalt . . . 0.1 g/mL

The above stainless substrate was pretreated by alkaline washing (at normal temperature for 30 seconds), and then dipped in hydrochloric acid (a 10% aqueous solution of hydrochloric acid for 30 seconds). After the pretreatment, the stainless substrate was washed with water, then dipped in the hydrochloric acid plating solution A for 10 seconds, and then washed with water for observation under a scanning electron microscope. As a result, it was identified that the number of minute pits appearing on the surface of the stainless substrate was up to 5 per unit area ($mm^2$).

After the pretreatment, the above stainless substrate was washed with water, just after which the first gold-plating layer was formed all over the surface of the stainless substrate using the above hydrochloric acid plating solution A under the following conditions. By adjusting the plating time, the first gold-plating layers in five thicknesses (Samples 1-1 to 1-5) were formed as shown in the following Table 1.

(First Gold-Plating Conditions)

Current density . . . 3A/dm2

Plating time . . . 5 to 15 seconds

Second Plating Step

A cyanide plating solution having the following composition was prepared as the cyanide plating solution.

(Composition of the Cyanide Plating Solution)

Metallic gold . . . 6.0 g/mL

Cobalt . . . 0.5 g/mL

Then, there was a mask (formed of silicon material used for general-purpose plating) provided, having a total of 100 (ten-by-ten) linear openings of 1,800 μm in width and 4,800 μm in length at a width direction pitch of 4,000 μm and a length direction pitch of 7,000 μm. This mask was located on the first gold-plating layer formed on the main plane of the stainless substrate having the linear recesses (the processing site) in such a way as to have its openings in alignment with the recesses (the processing site). A mask formed of the same material but with no opening was located on the first gold-plating layer on another main plane of the stainless substrate. And through these masks, the second gold-plating layer (of 0.25 μm in thickness) was formed on the first gold-plating layer using the above cyanide plating solution under the following conditions. Note here that the plating time was optionally adjusted in the following range to provide the second gold-plating layer of 0.25 μm in thickness.

(Second Gold-Plating Conditions)

Current density . . . 12A/dm2

Plating time . . . 3 to 10 seconds

Stripping Step

An alkaline stripping solution (Gold Stripper 645 made by Evonik Degussa Japan Co., Ltd.) was used as the stripping solution, and the stainless substrate was dipped in this stripping solution (having a temperature of 25 to 35° C.) for 10 seconds, followed by washing with water. This allowed an exposed portion of the first gold-plating layer to be stripped off to form the gold-plating layer only on the linear recesses (processing site) of the stainless steel.

Estimations (Adhesion Testing)

The stainless substrate having the gold-plating layer pattern formed on it was held at 350° C. for 5 minutes and then cooled back to normal temperature to observe whether or not there were abnormal swelling and cracking under a microscope. The results are set out in the following Table 1.

(Tape Removal Testing)

An adhesive tape (No. 600 made by Sumitomo 3M Limited) was used for tape removal testing on the gold-plating layer pattern. The results of whether or not the gold-plating layer pattern was removed are set out in the following Table 1. In this tape removal testing on the gold-plating layer pattern positioned on the bottom plane of the recess, a thicker portion of the stainless substrate was folded back or beforehand cut from the side plane of the recess such that the adhesive tape was applied to the bottom plane of the recess.

(Attack on the Substrate)

The surface of the stainless substrate exposed by removal of the first gold-plating layer in the stripping step was observed under a microscope to make estimation of whether or not there was an attack on the stainless substrate. The results are set out in the following Table 1.

TABLE 1

| Sample No. | Thickness of the Frist Gold-Plating Layer (μm) | Thickness of the Second Gold-Plating Layer (μm) |
|---|---|---|
| 1-1 | 0.010 | 0.25 |
| 1-2 | 0.020 | 0.25 |
| 1-3 | 0.050 | 0.25 |
| 1-4 | 0.10 | 0.25 |
| 1-5 | 0.15 | 0.25 |

| | Estimations | | |
|---|---|---|---|
| Sample No. | Adhesion Testing | Tape Removal | Attack on the Substrate |
| 1-1 | Passed | No removal | No attack |
| 1-2 | Passed | No removal | No attack |
| 1-3 | Passed | No removal | No attack |
| 1-4 | Passed | No removal | No attack |
| 1-5 | passed | No removal | No attack |

As set out in Table 1, it has been found that the invention makes it possible to form a thin-film, partial gold-plating pattern of up to 1 μm directly only on the processing site of the stainless substrate, and the formed pattern shows improved adhesion to the stainless substrate with no attack on the stainless substrate either.

EXAMPLE 2

The same stainless substrate as in Example 1 was provided. A total of 100 (ten-by-ten) square through-holes, each having one opening side of 1,000 μm, were formed on the stainless substrate at a pitch of 2,000 μm in both length and width directions such that they were positioned at the points of intersection of the grid to obtain the stainless substrate having the processing site.

First Plating Step

As in Example 1, the stainless substrate was pretreated and washed with water, just after which the first gold-plating layer was formed all over the surface of the stainless substrate using the same hydrochloric acid plating solution A as in Example 1 under the same plating conditions as in Example 1. The plating time was adjusted to form the first gold-plating layers in five such thicknesses as shown in the following Table 2 (Samples 2-1 to 2-5).

Second Plating Step

The cyanide plating solution similar in composition to that of Example 1 was prepared.

There was a set of masks (formed of silicon material used for general-purpose plating) provided, each having a total of 100 (ten-by-ten) square openings having one opening side of 900 μm at a pitch of 2,000 μm in both the length and width directions such that they were positioned at the points of intersection of the grid. And the respective masks were located on the first gold-plating layers on both the main planes of the stainless substrate such that the centers of their openings were in alignment with the centers of the through-holes (the processing site) through the stainless substrate. Thereafter, through these masks the second gold-plating layer (of 0.25 μm in thickness) was formed on the first gold-plating layer using the cyanide plating solution under the same plating conditions as in Example 1.

Stripping Step

As in Example 1, the exposed portion of the first gold-plating layer was stripped. Thus, the exposed portion of the first gold-plating layer was so stripped that the gold-plating layer could be formed directly only on the wall planes of the through-holes (processing site) through the stainless substrate.

Estimations

As in Example 1, adhesion testing, tape removal testing and estimation of an attack on the substrate were carried out, and the results are set out in Table 2. In this tape removal testing on the gold-plating layer pattern positioned on the wall plane of the through-holes, a thicker portion of the stainless substrate was folded back or beforehand cut from the side plane of the through-holes such that the adhesive tape was applied to the wall plane of the through-holes.

TABLE 2

| Sample No. | Thickness of the Frist Gold-Plating Layer (μm) | Thickness of the Second Gold-Plating Layer (μm) |
|---|---|---|
| 2-1 | 0.010 | 0.25 |
| 2-2 | 0.020 | 0.25 |
| 2-3 | 0.050 | 0.25 |
| 2-4 | 0.10 | 0.25 |
| 2-5 | 0.15 | 0.25 |

| | Estimations | | |
|---|---|---|---|
| Sample No. | Adhesion Testing | Tape Removal | Attack on the Substrate |
| 2-1 | Passed | No removal | No attack |
| 2-2 | Passed | No removal | No attack |
| 2-3 | Passed | No removal | No attack |
| 2-4 | Passed | No removal | No attack |
| 2-5 | passed | No removal | No attack |

As set out in Table 2, it has been found that the invention makes it possible to form a thin-film, partial gold-plating pattern of up to 1 μm directly only on the processing site of the stainless substrate, and the formed pattern shows improved adhesion to the stainless substrate with no attack on the stainless substrate either.

EXAMPLE 3

As in Example 1, the stainless substrate having recesses as the processing site was provided.

First Plating Step

As in Example 1, the stainless substrate was pretreated and washed with water, just after which the first gold-plating layer was formed all over the surface of the stainless substrate using the same hydrochloric acid plating solution A as in Example 1 under the same plating conditions as in Example 1. The plating time was adjusted to form the first gold-plating layers in five such thicknesses as shown in the following Table 3 (Samples 3-1 to 3-5).

Second Plating Step

The hydrochloric acid plating solution B having the following composition was prepared as the hydrochloric acid plating solution.

(Composition of Hydrochloric Acid Plating Solution B)

Metallic gold . . . 4.0 g/mL

Hydrochloric acid . . . 60 g/mL

Cobalt . . . 0.1 g/mL

After the stainless substrate was pretreated as in Example 1, it was dipped in this hydrochloric acid plating solution B for 10 seconds and washed with water for observation under a scanning electron microscope. As a result, it was identified that the number of minute pits appearing on the surface of the stainless substrate exceeded 5 (10 to 15) per unit area ($mm^2$).

Then, there was a mask (formed of silicon material used for general-purpose plating) provided, having a total of (ten-by-ten) 100 linear openings of 1,800 μm in width and 4,800 μm in length at a width direction pitch of 4,000 μm and a length direction pitch of 7,000 μm. This mask was located on the first gold-plating layer formed on the main plane of the stainless substrate having linear recesses (processing site) such that the centers of the openings in the mask were in alignment with the centers of the recesses (processing site). A mask formed of the same material but with no openings was located on the first gold-plating layer on another main plane of the stainless substrate. And through these masks, the second gold-plating layer (of 0.25 μm in thickness) was formed on the first gold-plating layer using the above hydrochloric acid plating solution B under the following conditions. Note here that the plating time was optionally adjusted in the following range to provide the second gold-plating layer of 0.25 μm in thickness.

(Second Gold-Plating Conditions)

Current density . . . 3A/dm2

Plating time . . . 50 to 60 seconds

Stripping Step

As in Example 1, the exposed portion of the first gold-plating layer was stripped. This enabled the exposed portion of the first gold-plating layer to be stripped, thereby forming the gold-plating layer directly only on the linear recesses (processing site) of the stainless substrate.

Estimations

As in Example 1, adhesion testing, tape removal testing and the estimation of attacks on the substrate were carried out. The results are set out in the following Table 3.

TABLE 3

| Sample No. | Thickness of the Frist Gold-Plating Layer (μm) | Thickness of the Second Gold-Plating Layer (μm) |
|---|---|---|
| 3-1 | 0.010 | 0.25 |
| 3-2 | 0.015 | 0.25 |
| 3-3 | 0.05 | 0.25 |
| 3-4 | 0.10 | 0.25 |
| 3-5 | 0.15 | 0.25 |

| | Estimations | | |
|---|---|---|---|
| Sample No. | Adhesion Testing | Tape Removal | Attack on the Substrate |
| 3-1 | Passed | Removed | Attack found |
| 3-2 | Passed | No removal | No attack |
| 3-3 | Passed | No removal | No attack |
| 3-4 | Passed | No removal | No attack |
| 3-5 | passed | No removal | No attack |

As can be seen from Table 3, it is preferable that when the hydrochloric acid plating solution is used in the second plating step, the first gold-plating layer formed in the first plating step has a thickness of 0.015 μm or more. It has been found that when the first gold-plating layer is 0.015 μm or more in thickness, a thin-film, partial gold-plating pattern of up to 1 μm can be formed directly only on the processing site with no attack on the stainless substrate either, and the formed pattern shows improved adhesion to the stainless substrate.

EXAMPLE 4

As in Example 2, a stainless substrate having through-holes as the processing site was provided.

First Plating Step

As in Example 1, the stainless substrate was pretreated and washed with water, just after which the first gold-plating layer was formed all over the surface of the stainless substrate using the same hydrochloric acid plating solution A as in Example 1 under the same plating conditions as in Example 1. The plating time was adjusted to form the first gold-plating layers in five such thicknesses as shown in the following Table 4 (Samples 4-1 to 4-5).

Second Plating Step

The Hydrochloric acid plating solution B similar in composition to that of Example 3 was prepared.

There was then a set of masks (formed of a silicon material used for general purposes) provided, each having a total of (ten-by-ten) 100 square openings having one opening side of 900 μm at a pitch of 2,000 μm in both the length and width directions such that they were positioned at the points of intersection of the grid. And the respective masks were located on the first gold-plating layers on both the main planes of the stainless substrate such that their openings were positioned on the through-holes (the processing site) through the stainless substrate. Thereafter, through these masks the second gold-plating layer (of 0.25 μm in thickness) was formed on the first gold-plating layer using the hydrochloric acid plating solution B under the same plating conditions as in Example 3.

Stripping Step

As in Example 1, the exposed portion of the first gold-plating layer was stripped. Thus, the exposed portion of the first gold-plating layer was so stripped that the gold-plating layer could be formed directly only on the wall planes of the through-holes (processing site) through the stainless substrate.

Estimations

As in Example 2, adhesion testing, tape removal testing and the estimation of an attack on the substrate were carried out, and the results are set out in Table 4.

TABLE 4

| Sample No. | Thickness of the Frist Gold-Plating Layer (μm) | Thickness of the Second Gold-Plating Layer (μm) |
|---|---|---|
| 4-1 | 0.010 | 0.25 |
| 4-2 | 0.015 | 0.25 |
| 4-3 | 0.05 | 0.25 |
| 4-4 | 0.10 | 0.25 |
| 4-5 | 0.15 | 0.25 |

| | Estimations | | |
|---|---|---|---|
| Sample No. | Adhesion Testing | Tape Removal | Attack on the Substrate |
| 4-1 | Passed | Removed | Attack found |
| 4-2 | Passed | No removal | No attack |
| 4-3 | Passed | No removal | No attack |
| 4-4 | Passed | No removal | No attack |
| 4-5 | passed | No removal | No attack |

As can be seen from Table 4, it is preferable that when the hydrochloric acid plating solution is used in the second plating step, the first gold-plating layer formed in the first plating step has a thickness of 0.015 μm or more. It has been found that when the first gold-plating layer is 0.015 μm or more in thickness, a partial gold-plating pattern of up to 1 μm can be formed directly only on the processing site with no attack on the stainless substrate either, and the formed pattern shows improved adhesion to the stainless substrate.

EXAMPLE 5

Example 1 was repeated with the exception that a (150 mm×150 mm) SUS 316L material of 0.15 mm in thickness was used as the stainless substrate to form five partial gold-plating patterns directly on the stainless substrate having the processing site.

As in Example 1, adhesion testing, tape removal testing and the estimation of attacks on the substrate were performed with five samples each having the partial gold-plating pattern formed on it. The results were similar to those of Example 1 (there was nothing wrong with adhesion testing, there was no removal in tape removal testing, and there was no attack on the stainless substrate).

EXAMPLE 6

Example 3 was repeated with the exception that a (150 mm×150 mm) SUS 316L material of 0.15 mm in thickness was used as the stainless substrate to form five partial gold-plating patterns directly on the stainless substrate having the processing site.

As in Example 3, adhesion testing, tape removal testing and the estimation of attacks on the substrate were performed with five samples each having the partial gold-plating pattern formed on it. The results were similar to those of Example 3 (in the case of the samples having the first gold-plating layer of 0.015 μm or more in thickness, there was nothing wrong with adhesion testing, there was no removal in tape removal testing, and there was no attack on the stainless substrate).

EXAMPLE 7

Example 1 was repeated with the exception that (150 mm×150 mm) SUS 304 and SUS 304L materials of 0.15 mm in thickness were used as the stainless substrate to form five partial gold-plating patterns directly on the stainless substrate having the processing site.

As in Example 1, adhesion testing, tape removal testing and the estimation of attacks on the substrate were performed with five samples for each stainless substrate having the partial gold-plating pattern formed on it. The results were similar to those of Example 1 (there was nothing wrong with adhesion testing, there was no removal in tape removal testing, and there was no attack on the stainless substrate).

EXAMPLE 8

Example 3 was repeated with the exception that (150 mm×150 mm) SUS 304 and SUS 304L materials of 0.15 mm in thickness were used as the stainless substrate to form five partial gold-plating patterns directly on the stainless substrate having the processing site.

As in Example 3, adhesion testing, tape removal testing and the estimation of attacks on the substrate were performed with five samples for each stainless substrate having the partial gold-plating pattern formed on it. The results were similar to those of Example 3 (in the case of the samples having the first gold-plating layer of 0.015 μm or more in thickness, there was nothing wrong with adhesion testing, there was no removal in tape removal testing, and there was no attack on the stainless substrate).

EXAMPLE 9

A (150 mm×150 mm) SUS 316L material of 0.15 mm in thickness was used as the stainless substrate.

Using masks having mutually different openings on both the main planes of the stainless substrate, it was etched to form a total of (ten-by-ten) 100 structures at a pitch of 7,000 μm in both the length and width directions such that they were positioned at the points of intersection of the grid thereby obtaining the stainless substrate having the processing site, each of said structures having a square recess of 100 μm in depth and 5,000 μm in side length on one main plane and a square through-hole of 2,000 μm in side length at the center of the recess.

First Plating Step

As in Example 1, the stainless substrate was pretreated and washed with water, just after which the first gold-plating layer was formed all over the surface of the stainless substrate using the same hydrochloric acid plating solution A as in Example 1 under the same conditions as in Example 1. Thus, the first gold-plating layer formed had five such thicknesses as shown in Table 1.

Second Plating Step

A cyanide plating solution similar in composition to that of Example 1 was prepared.

There was then a mask (formed of silicon material used for general-purpose plating) provided, having a total of (ten-by-ten) 100 square openings of 4,600 μm in side length at a pitch of 7,000 μm in both the length and width directions such that they were positioned at the points of intersection of the grid. Then, the mask was located on the first gold-plating layer on one main plane of the stainless substrate having the recesses such that the centers of the openings in the mask were in alignment with the centers of the recesses.

There was also a mask provided that was formed of the same mask material and had a total of (ten-by-ten) 100 square openings of 1,800 μm in side length at a pitch of 7,000 μm in both the length and width directions such that they were positioned at the points of intersection of the grid. Then, the mask was located on the first gold-plating layer on another main plane of the stainless substrate such that the centers of the openings in the mask were in alignment with the centers of the through-holes.

And through these masks, the second gold-plating layer was formed on the first gold-plating layer using the above cyanide plating solution under the following plating conditions to form the second gold-plating layer (of 0.25 μm in thickness).

Stripping Step

As in Example 1, the exposed portion of the first gold-plating layer was stripped. Thus, the exposed portion of the first gold-plating layer was so stripped that the gold-plating layer could be formed directly only on the wall planes of the recesses and the through-holes in them (processing site) of the stainless substrate.

Estimations

As in Example 1, adhesion testing, tape removal testing and the estimation of attacks on the substrate were performed with five samples each having the partial gold-plating pattern formed on it. The results were similar to those of Example 1 (there was nothing wrong with adhesion testing, there was no removal in tape removal testing, and there was no attack on the stainless substrate).

EXAMPLE 10

A (150 mm×150 mm) SUS 316 material of 0.15 mm in thickness was provided as the stainless substrate.

First Plating Step

The hydrochloric acid plating solution A having the same composition as in Example 1 was prepared as the hydrochloric acid plating solution.

The above stainless substrate was pretreated by alkaline washing (at normal temperature for 30 seconds), and then dipped in hydrochloric acid (a 10% aqueous solution of hydrochloric acid for 30 seconds). After the pretreatment, the stainless substrate was washed with water, after which dry film resists were laminated on both planes of the stainless substrate, and then patterned by photolithography to form a resist pattern including a circular opening of 3 mm in diameter and having a thickness of 15 μm. The stainless substrate having the thus formed resist pattern was dipped in the above hydrochloric acid plating solution A for 10 seconds, and then washed with water for observation under a scanning electron microscope. As a result, it has been identified that the number of minute pits appearing on the surface of the stainless substrate was up to 2 per unit area (mm2).

Using the above hydrochloric acid plating solution A under the same conditions as in Example 1, the first gold-plating layer was formed on the exposed surface of the stainless substrate having the resist pattern formed as described above. By adjusting the plating time, the first gold-plating layers in five thicknesses (Samples 10-1 to 10-5) were formed as shown in the following Table 5.

Second Plating Layer

The cyanide plating solution having the same composition as in Example 1 was prepared as the cyanide plating solution.

There was a set of masks (formed of silicon material used for general-purpose plating) provided, having a circular opening of 2 mm in diameter. The respective masks were located on both surfaces of the stainless substrate such that the center of the circular opening in the mask was in alignment with the center of the first gold-plating layer (of 3 mm diameter circular shape). And through these masks, the second gold-plating layer (of 0.25 μm in thickness) was formed on the first gold-plating layer using the above cyanide plating solution under the same conditions as in Example 1.

Thereafter, the masks were removed, and the stainless substrate was dipped in an alkaline stripping solution (a 3% aqueous solution of sodium hydroxide having a temperature of 50° C.) for 30 seconds, and then washed with water thereby stripping off the resist pattern.

Stripping Step

An alkaline stripping solution (Gold Stripper 645 made by Evonik Degussa Japan Co., Ltd.) was used as the stripping solution, and the stainless substrate was dipped in this stripping solution (having a temperature of 25 to 35° C.) for 10 seconds, followed by washing with water. This allowed a portion of the first gold-plating layer in an area where there was none of the second gold-plating layer to be stripped off to form the gold-plating layer directly only on the stainless steel in a circular pattern of 2 mm in diameter.

Estimations (Adhesion Testing)

The stainless substrate having the gold-plating layer pattern formed on it was held at 350° C. for 5 minutes and then cooled back to normal temperature to observe whether or not there were abnormal swelling and cracking under a microscope. The results are set out in the following Table 5.

(Tape Removal Testing)

An adhesive tape (No. 600 made by Sumitomo 3M Limited) was used for tape removal testing on the gold-plating layer pattern. The results of whether or not the gold-plating layer pattern was removed are set out in the following Table 5.

(Attack on the Substrate)

The surface of the stainless substrate exposed by removal of the first gold-plating layer in the stripping step was observed under a microscope to make estimation of whether or not there was an attack on the stainless substrate. The results are set out in the following Table 5.

TABLE 5

| Sample No. | Thickness of the Frist Gold-Plating Layer (μm) | Thickness of the Second Gold-Plating Layer (μm) |
|---|---|---|
| 10-1 | 0.010 | 0.25 |
| 10-2 | 0.020 | 0.25 |
| 10-3 | 0.050 | 0.25 |
| 10-4 | 0.10 | 0.25 |
| 10-5 | 0.15 | 0.25 |

| | Estimations | | |
|---|---|---|---|
| Sample No. | Adhesion Testing | Tape Removal | Attack on the Substrate |
| 10-1 | Passed | No removal | No attack |
| 10-2 | Passed | No removal | No attack |
| 10-3 | Passed | No removal | No attack |
| 10-4 | Passed | No removal | No attack |
| 10-5 | passed | No removal | No attack |

As set out in Table 5, it has been found that the invention makes it possible to form a thin-film, partial gold-plating pattern of up to 1 μm directly only on a desired site of the stainless substrate, and the formed pattern shows improved adhesion to the stainless substrate with no attack on the stainless substrate either.

EXAMPLE 11

As in Example 10, there was a stainless substrate provided.

First Plating Step

As in Example 10, the stainless substrate was pretreated and provided with a resist pattern, just after which the first gold-plating layer was formed on an exposed surface of the stainless substrate using the same hydrochloric acid plating solution A as in Example 1 under the same plating conditions as in Example 1. By adjusting the plating time, the first gold-plating layers in five thicknesses (Samples 11-1 to 11-5) were formed as shown in the following Table 6.

Second Plating Layer

The hydrochloric acid plating solution B similar in composition to that of Example 3 was used as the hydrochloric acid plating solution.

The above stainless substrate having the resist pattern formed on it was dipped in this hydrochloric acid plating solution B for 10 seconds, and then washed with water for observation under a scanning electron microscope. As a result, it was identified that the number of minute pits appearing on the surface of the stainless substrate exceeded 5 (10 to 15) per unit area ($mm^2$).

There was a set of masks (formed of silicon material used for general-purpose plating) provided, having a circular opening of 2 mm in diameter. The respective masks were located on both surfaces of the stainless substrate such that the center of the circular opening in the mask was in alignment with the center of the first gold-plating layer (of 3 mm diameter circular shape) formed on the exposed surface of the stainless substrate. And through these masks, the second gold-plating layer (of 0.25 μm in thickness) was formed on the first gold-plating layer using the above hydrochloric acid plating solution B under the same conditions as in Example 3.

Thereafter, the masks were removed, and the resist pattern was stripped off as in Example 10.

Stripping Step

As in Example 10, the exposed portion of the first gold-plating layer was stripped off. This enabled the portion of the first gold-plating layer in an area where there was none of the second gold-plating layer was so stripped off that the gold-plating layers could be formed directly on the stainless substrate in a circular pattern of 2 mm in diameter.

Estimations

As in Example 10, adhesion testing, tape removal testing and the estimation of attacks on the substrate were carried out, and the results are set out in the following Table 6.

TABLE 6

| Sample No. | Thickness of the Frist Gold-Plating Layer (μm) | Thickness of the Second Gold-Plating Layer (μm) |
|---|---|---|
| 11-1 | 0.010 | 0.25 |
| 11-2 | 0.015 | 0.25 |
| 11-3 | 0.05 | 0.25 |
| 11-4 | 0.10 | 0.25 |
| 11-5 | 0.15 | 0.25 |

TABLE 6-continued

| | Estimations | | |
|---|---|---|---|
| Sample No. | Adhesion Testing | Tape Removal | Attack on the Substrate |
| 11-1 | Passed | Removed | Attack found |
| 11-2 | Passed | No removal | No attack |
| 11-3 | Passed | No removal | No attack |
| 11-4 | Passed | No removal | No attack |
| 11-5 | passed | No removal | No attack |

As can be seen from Table 6, it is preferable that when the hydrochloric acid plating solution is used in the second plating step, the first gold-plating layer formed in the first plating step has a thickness of 0.015 μm or more. It has been found that when the first gold-plating layer is 0.015 μm or more in thickness, a partial gold-plating pattern of up to 1 μm can be formed directly only on the stainless substrate with no attack on the stainless substrate, and the formed pattern shows improved adhesion to the stainless substrate.

EXAMPLE 12

Example 10 was repeated with the exception that a 0.15 mm thick SUS 316L material (150 mm×150 mm) was used as the stainless substrate to form five gold-plating layers (a circular pattern of 2 mm in diameter) having the first gold-plating layers of different thicknesses directly on the stainless substrate.

As in Example 10, adhesion testing, tape removal testing and the estimation of attacks on the substrate were performed with the thus prepared five samples. The results were similar to those of Example 10 (there was nothing wrong with adhesion testing, there was no removal in tape removal testing, and there was no attack on the stainless substrate).

EXAMPLE 13

Example 11 was repeated with the exception that a 0.15 mm thick SUS 316L material (150 mm×150 mm) was used as the stainless substrate to form five gold-plating layers (a circular pattern of 2 mm in diameter) having the first gold-plating layers of different thicknesses directly on the stainless substrate.

As in Example 10, adhesion testing, tape removal testing and the estimation of attacks on the substrate were performed with the thus prepared five samples. The results were similar to those of Example 11 (in the case of the samples having the first gold-plating layers of 0.015 μm or more in thickness, there was nothing wrong with adhesion testing, there was no removal in tape removal testing, and there was no attack on the stainless substrate).

EXAMPLE 14

0.15 mm thick SUS 304 and 304L materials (150 mm×150 mm) were provided as the stainless substrates, and as in Example 10, five gold-plating layers (a circular pattern of 2 mm in diameter) having the first gold-plating layers of different thicknesses were formed directly on the two stainless substrates.

As in Example 10, adhesion testing, tape removal testing and the estimation of attacks on the substrate were performed with the five samples prepared using the two stainless substrates. The results were similar to those of Example 10 (there was nothing wrong with adhesion testing, there was no removal in tape removal testing, and there was no attack on the stainless substrates).

EXAMPLE 15

0.15 mm thick SUS 304 and 304L materials (150 mm×150 mm) were provided as the stainless substrates, and as in Example 11, five gold-plating layers (a circular pattern of 2 mm in diameter) having the first gold-plating layers of different thicknesses were formed directly on the two stainless substrates.

As in Example 10, adhesion testing, tape removal testing and the estimation of attacks on the substrate were performed with the five samples prepared using the two stainless substrates. The results were similar to those of Example 11 (in the case of the samples having the first gold-plating layers of 0.015 μm or more in the thickness, there was nothing wrong with adhesion testing, there was no removal in tape removal testing, and there was no attack on the stainless substrates).

Applicability to the Industry

The present invention may be used in a variety of production fields where there is the need of forming gold-plating patterns on stainless steels.

EXPLANATION OF THE REFERENCE NUMERALS

1, 11 . . . Stainless Substrate
1*a*, 1*b*, 11*a*, 11*b* . . . Main Plane
2 . . . Through-Hole
2*a* . . . Wall Plane
12 . . . Recess
12*a* . . . Bottom Plane
12*b* . . . Wall Plane
4, 14 . . . Gold-Plating Pattern
5, 15 . . . First Gold-Plating Layer
6, 16 . . . Second Gold-Plating Layer
8, 18, 18' . . . Mask
9, 19 . . . Opening
21, 31 . . . Stainless Substrate
21*a*, 21*b*, 31*a*, 31*b* . . . Main Plain
22, 32 . . . Recess
22*a*, 32*a* . . . Bottom Plane
22*b*, 32*b* . . . Wall Plane
23, 33 . . . Through-Hole
23*a* 33*a* . . . Wall Plane
24, 34*a* . . . Gold-Plating Layer
34*b* . . . Gold-Plating Thin Film

What is claimed is:

1. A stainless substrate comprising:
opposite main planes having uncoated surfaces;
a processing site, including a through-hole, on a plane different from the main planes; and
a gold-plating layer having a thickness in a range of 0.15 to 0.25 μm on an entire surface of the through-hole,
wherein no gold-plating layer is provided on the main planes.

2. The stainless substrate as recited in claim 1, obtained by a process comprising:
applying pretreatment to a stainless steel substrate including the opposite main planes and processing site;
forming a first gold-plating layer all over the surface of the stainless steel substrate using a hydrochloric acid plating solution;

forming a second gold-plating layer on the first gold-plating layer that covers the processing site in a pattern by mask plating; and stripping off a portion of the first gold-plating layer in an area where there is none of the second gold-plating layer using an alkaline stripping solution in order to form the gold-plating layer having the thickness in the range of 0.15 to 0.25 μm on the entire surface of the through-hole.

3. The stainless substrate as recited in claim 1, obtained by a process comprising:

applying pretreatment to a stainless steel substrate including the opposite main planes and processing site;

forming a resist pattern on the stainless steel substrate so as to expose a region including at least the processing site;

forming a first gold-plating layer on an exposed surface of the stainless steel substrate using a hydrochloric acid plating solution;

forming a second gold-plating layer on the first gold-plating layer that covers the processing site in a pattern by mask plating; and stripping off a portion of the first gold-plating layer in an area where there is none of the second gold-plating layer using an alkaline stripping solution in order to form the gold-plating layer having the thickness in the range of 0.15 to 0.25 μm on the entire surface of the through-hole.

4. A product comprising the stainless substrate as recited in claim 1, wherein the product is selected from the group consisting of connectors, fuel cells, hard disk suspensions, and inkjets.

5. The stainless substrate as recited in claim 1, wherein the gold-plating layer has a laminated structure including a first gold-plating layer on the entire surface of the through-hole and a second gold-plating layer on the first gold-plating layer.

6. The stainless substrate as recited in claim 5, wherein the first gold-plating layer has a thickness in the range of 0.010 to 0.15 μm.

7. A stainless substrate comprising:

opposite main planes having uncoated surfaces;

a processing site on a plane different from the main planes that includes a combination of a recess and a through-hole; and a gold-plating layer having a thickness in a range of 0.15 to 0.25 μm on an entire surface of the combination of the recess and the through-hole, wherein no gold-plating layer is provided on the main planes.

8. The stainless substrate as recited in claim 7, comprising a framework and a plurality of product regions that are joined to the framework, wherein individual product regions include the processing site.

9. The stainless substrate as recited in claim 7, wherein the gold-plating layer has a laminated structure including a first gold-plating layer on the entire surface of the combination of the recess and the through-hole, and a second gold-plating layer on the first gold-plating layer.

10. A product comprising a stainless substrate that includes:

opposite main planes having uncoated surfaces;

a processing site, including a through-hole, on a plane different from the main planes; and a gold-plating layer having a thickness in a range of 0.15 to 1 μm on an entire surface of the through-hole, wherein:

no gold-plating layer is provided on the main planes; and the product is selected from the group consisting of connectors, fuel cells, hard disk suspensions, and inkjets.

* * * * *